United States Patent
Botrel et al.

(10) Patent No.: US 6,428,281 B1
(45) Date of Patent: Aug. 6, 2002

(54) TURBINE VANE WITH ENHANCED PROFILE

(75) Inventors: Erwan Daniel Botrel, Alfortville; Christophe Germain Brisset; Bertrand Petot, both of Chartrettes, all of (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 09/624,486

(22) Filed: Jul. 24, 2000

(30) Foreign Application Priority Data

Aug. 18, 1999 (FR) .............................. 99 10584

(51) Int. Cl.7 ................................. F01D 5/14
(52) U.S. Cl. .................... 416/243; 416/223 A
(58) Field of Search ............... 416/223 R, 243, 416/223 A, 228; 415/173.1, 168.1

(56) References Cited

U.S. PATENT DOCUMENTS

| | | | | |
|---|---|---|---|---|
| 4,961,686 A | * | 10/1990 | Blair et al. ............. | 416/223 A |
| 5,167,489 A | | 12/1992 | Wadia et al. | |
| 5,226,783 A | * | 7/1993 | Mita ....................... | 416/223 R |
| 5,525,038 A | | 6/1996 | Sharma et al. | |
| 6,071,077 A | * | 6/2000 | Rowlands ............... | 416/223 A |
| D439,324 S | | 3/2001 | Wood | |

* cited by examiner

Primary Examiner—Edward K. Look
Assistant Examiner—Ninh Nguyen
(74) Attorney, Agent, or Firm—Oblon, Spivak, McClelland, Maier & Neustadt, P.C.

(57) ABSTRACT

A turbine vane with an enhanced profile including a trailing edge is curved inwards towards the suction face in the vicinity of the head, as if it was twisted, which opens the vane and limits leakage currents above the head. The flow is thus improved since the eddies formed by the irregular flows in front of the vane are reduced.

6 Claims, 3 Drawing Sheets

TURBINE VANE WITH ENHANCED PROFILE

BACKGROUND OF THE INVENTION

1. Field of the Invention

This invention relates to a turbine vane with an enhanced profile.

2. Discussion of the Background

A conventional turbine vane comprises, as shown in FIG. 1, a mobile blade 1 in an annular section 2, a platform 3 confining the section 2 and a projection 4 inserted in a groove of a hub 5 belonging to the rotor. The blade 1, which is the essential part of the vane, may be broken down into stacked sections 6, located at increasing radial distances from the rotation axis of the machine and running, curving inwards, from a leading edge 7 to a trailing edge 8 of the flow of gases circulating in the section 2. The surfaces of the blade 1 consist of a blade face 9 and a suction face 10 each running between the leading and trailing edges 7 and 8, as illustrated in FIG. 2. The gases from the machine blow onto the blade face 9 and induce a rotational movement of the hub 5 and the vanes attached to it, to the right in the figures.

The profile of the blades 1 generally varies as illustrated in FIG. 3, the sections 6 being longer and curving less towards the platform 3, which is supposed to give a good flow and a satisfactory mechanical resistance.

However, the reason for the invention is the need to reduce the leakage current between the head 11 of blade 1 and the housing 12 around the section 2, between which a clearance must remain. These leakage currents run from the blade face 9 to the suction face 10 along the arrows 13 in FIG. 2; they produce an eddy downstream from the vane, which interferes with the gas flow.

SUMMARY OF THE INVENTION

The object of the present invention is to provide a selected solution which consists of deforming the sections 6 closer to the head 11 of the vane to reduce the leakage currents at this point. Some patents mention other deformations which may be applied to this part of the vane in relation to the typical profile in FIG. 3. In this manner, the international application WO 96 14469 describes a vane in which the blade is curved inwards towards the suction face in the vicinity of the head, resulting in an overhanging suction face. The purpose of this arrangement is to drive back the gases blown onto the suction face radially, to the rotation axis, to prevent them from reaching the blade head and moving to other side of the vane, to the blade face, by passing through the clearance adjacent to the housing 12. The pressure on the suction face increases close to the head 11, which reduces the difference in pressure between the two sides of the head 11 and the leakages over the head from the blade face to the suction face. It is also possible to reduce said leakage currents in this case in different ways and under different conditions, by bending or favoring the flow at the blade face of the vane in the tangential direction close to the head 11, which diverts it from the radial direction of its leakage.

The measures planned in this case consist of curving the trailing edge outwards at the tip end of the blade such that the blade sections closest to the end of the head are increasingly opened, i.e. pointing in the direction of the flow close to the trailing edge and, therefore, divert the flow less at this point.

BRIEF DESCRIPTION OF THE DRAWINGS

The invention will now be described in more detail using the following figures.

DESCRIPTION OF THE PREFERRED EMBODIMENTS

Figure 1:
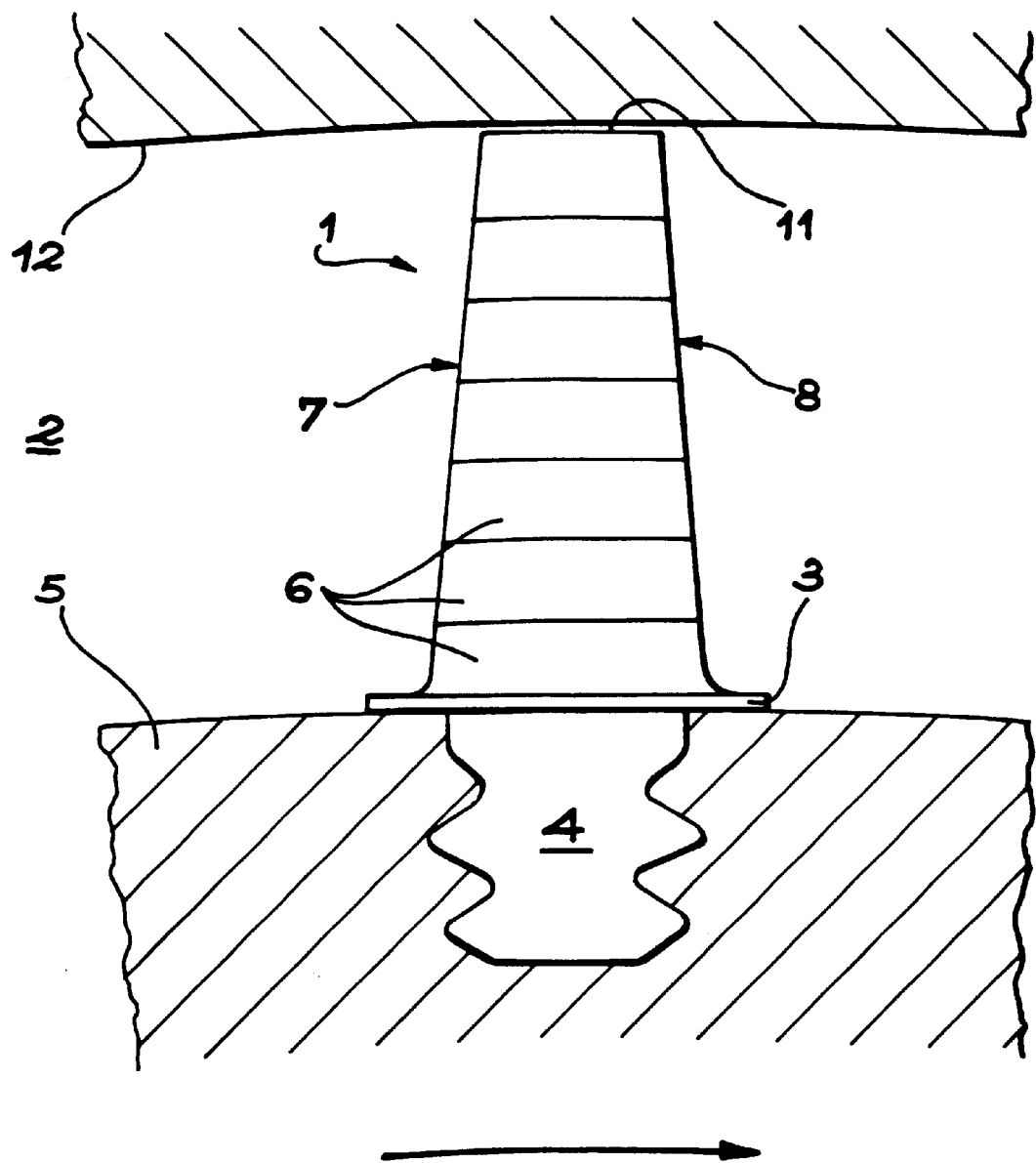
FIG. 1, 2 and 3 described above are various views of a typical vane.
Figure 2:
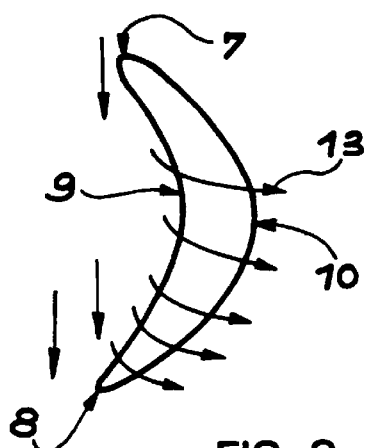
Figure 3:
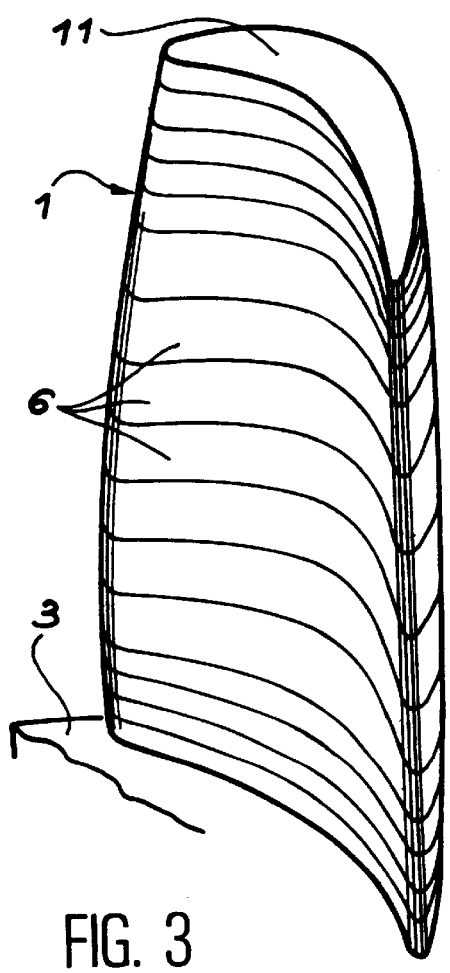

The references in FIGS. 1 to 3 increased by 100 are used to desognate the corresponding parts of the invention.

Figure 4:
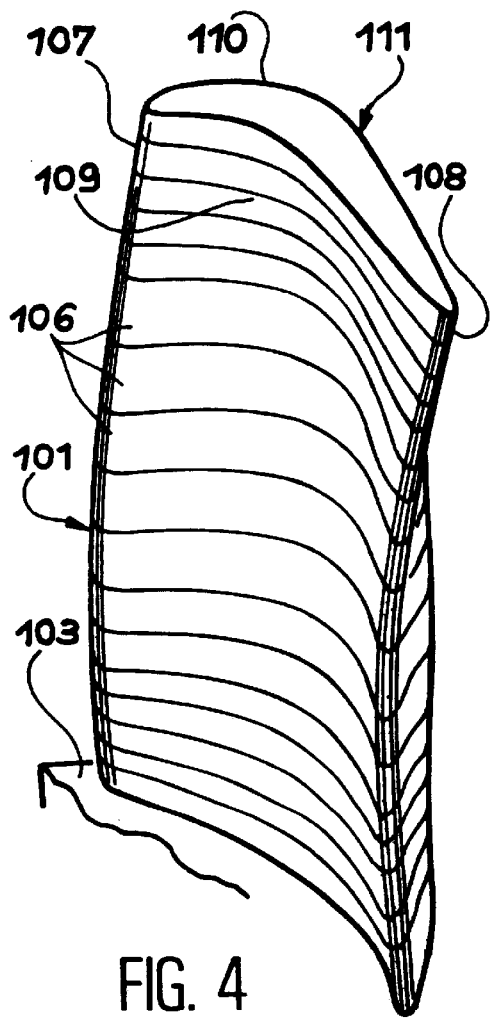
FIG. 4 is a view of the vane according to the invention.

The vane according to the invention, mainly illustrated in FIG. 4 differs from the prior vane in the vicinity of the head 111 in that the leading edge 108 is curved outward of the tip and towards the suction face 110 at this point, as if the corner of the blade 1 had been twisted outwards, while it may remain approximately rectilinear or approximately rectilinear closer to the platform 103, as in the prior design. This results in the sections 106 closer to the head 111 opening more closer to the trailing edge 108 than the other sections 106, i.e. they block the free flow of the gases in front of the vane less, since they are less curved than in the prior solution and they have a profile running approximately in the direction of the flow close the trailing edge 108.

Figure 5:
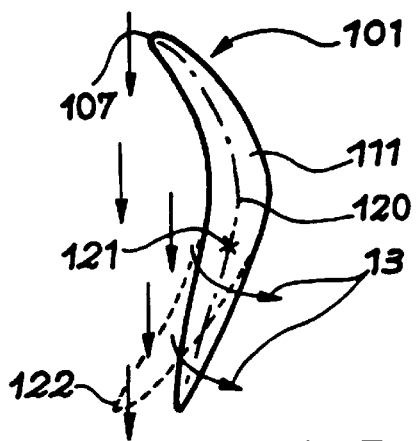
FIG. 5, similar to FIG. 2, shows the consequences of adopting the invention on the flow.

FIG. 5 shows that, in such a situation, the flow rate of the gases passing over the head 11 and diverted to the suction face 110 along the arrows 13 is lower, a larger portion of the flow passing along the vane to the trailing edge 108. It is possible to envisage, to restore the overall aerodynamic load or lift surface of the vane, to curve the sections 106 near the platform 3 and the median sections slightly more than in the conventional design, i.e. to close them.

The shape of the vane may be defined more strictly as follows: along a median line 120 of vane section, there is a point 121, defined by a curvilinear abscissa from the leading edge 107, after which the vane sections are curved to a decreasing degree, or are increasingly straight, distinguishing it from the design according to the application WO 96 14496 where the deformation of the vane does not affect the shape of the sections, which remains the same, particularly near the trailing edge. A vane section at a distance from the head 111 is designated with the reference 122.

Figure 6:
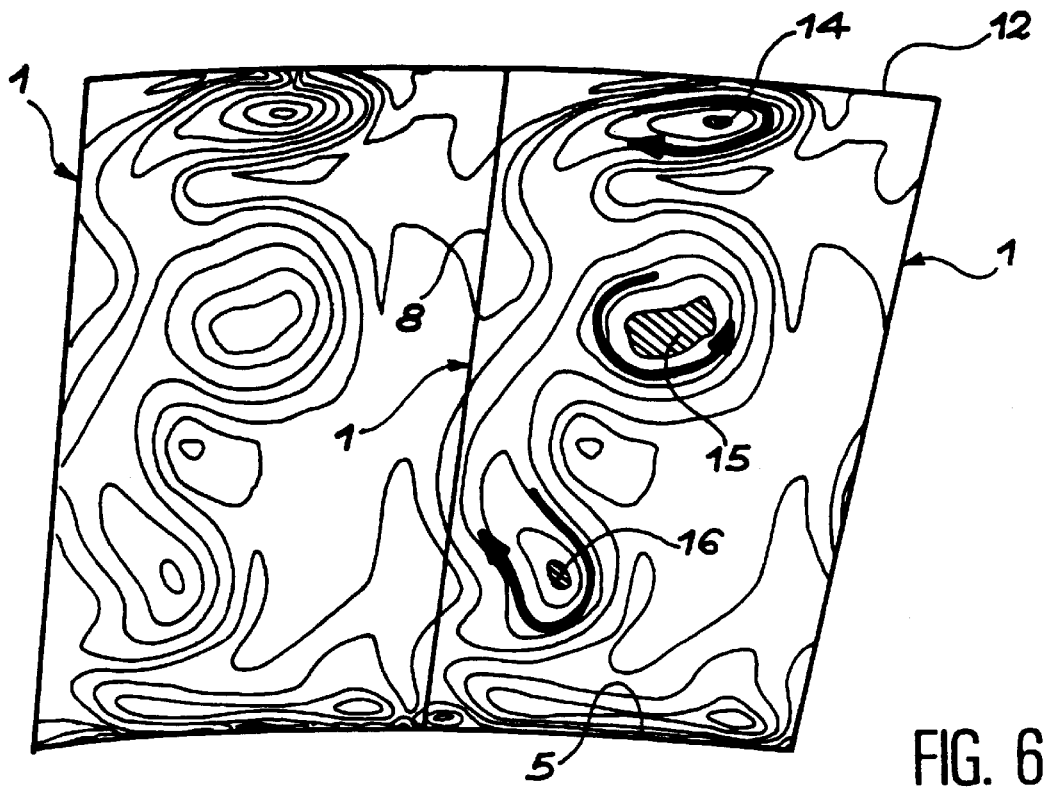
FIGS. 6 and 7 illustrate the pressures in front of the vanes in FIGS. 3 and 4, respectively.
Figure 7:
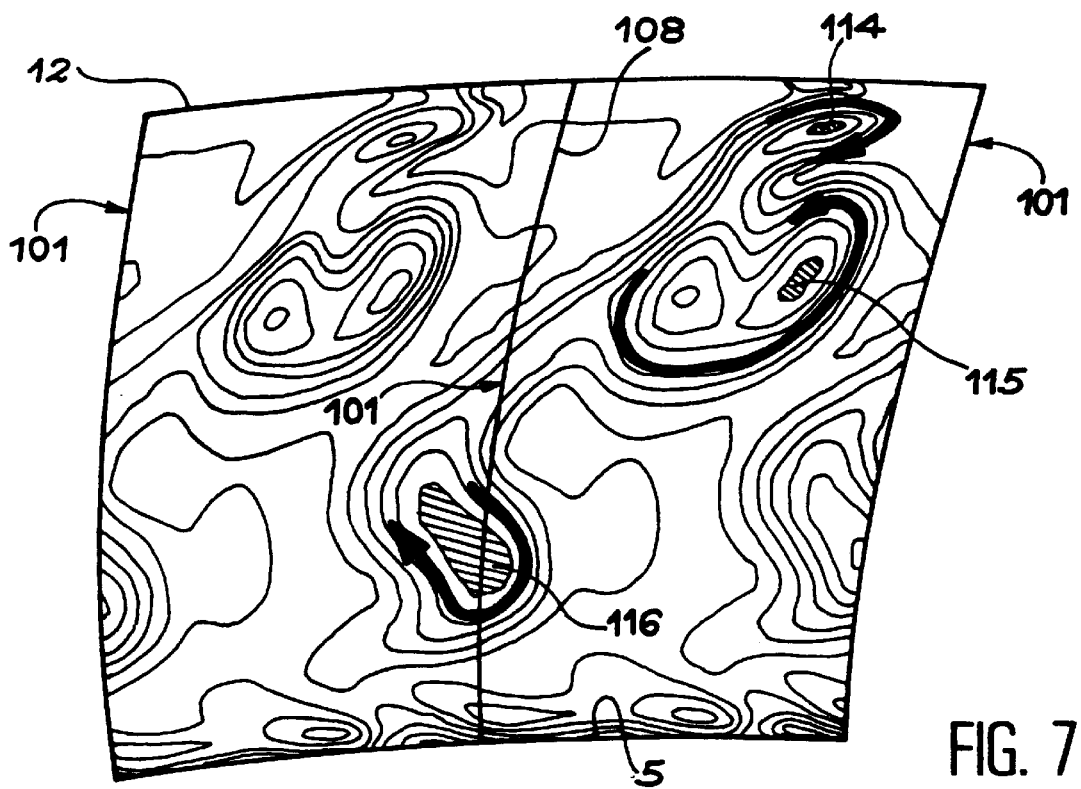

FIGS. 6 and 7 illustrate the eddies produced downstream from the vanes: one of them, called the clearance eddy, is referenced 14 and 114 in FIGS. 6 and 7, respectively, where the blades, 1 and 101, respectively, are viewed from the rear in the direction of their trailing edge 8 and 108. It can be seen that the eddy 114 has a smaller surface than the eddy 14; the vacuum produced is also weaker in intensity: the gas flow becomes more regular downstream from the vane. This is due to the reduction in leakages; however, the method used in the invention to reduce leakages also has an original effect that is very favourable for the regularity of the flow and the machine output.

The different profile of the trailing edge 108 affects other eddies, called passage eddies, which are two in number and located, in one case (15 or 115, respectively), closer to the housing 12 and, in the other (16 or 116, respectively), near the. hub 5. The first 15 or 115 remains approximately located at the same point (close to the clearance eddy 4 or 114), but the eddy 116 closer to the hub 5 is displaced significantly with reference to the eddy 6, and is located approximately in front of the trailing edge 108 instead of being on the side of the suction face 110, as for the other eddy 6. This results in the passage eddies 115 and 116 being further apart than the eddies 15 and 16 according to the prior art and, therefore, less likely to reinforce each other. Although they occupy a surface area similar to that of the conventional design, they are also not as strong since the vacuum applied is lower.

This illustrates the advantage of bending the leakage currents in the main (axial) direction of gas flow.

What is claimed is:

1. A turbine vane, which comprises a plurality of stacked sections extending from a platform to a head end, wherein sections closer to the head end comprise a profile which diverts a gas flow past the vane at a position in proximity with a trailing edge of a vane less than remaining sections of the vane.

2. A turbine vane according to claim 1, wherein the trailing edge is curved at said sections closer to the head end and is substantially rectilinear along the remaining sections of the vane.

3. A turbine vane according to claim 2, wherein said sections closer to the head end are less curved than the remaining sections of the vane.

4. A turbine vane according to claim 1, wherein said sections closer to the head are less curved than the remaining sections of the vane.

5. A turbine vane according to claim 4, wherein the vane has a shape which is twisted outwards at a corner between the head end and the trailing edge.

6. A turbine van according to claim 1, wherein the vane has a shape which is twisted outwardly at a corner thereof between the head end and the trailing edge.

* * * * *